United States Patent [19]
Conroy et al.

[11] 3,940,790
[45] Feb. 24, 1976

[54] SYSTEM FOR CONTROL OF READ/WRITE ON MAGNETIC TAPE

[75] Inventors: Walter J. Conroy, Billerica; Robert S. Prescott, Lexington; George G. Proulx, Bedford, all of Mass.

[73] Assignee: Honeywell Information Systems, Inc., Waltham, Mass.

[22] Filed: July 17, 1974

[21] Appl. No.: 489,286

Related U.S. Application Data
[63] Continuation of Ser. No. 331,758, Feb. 13, 1973.

[52] U.S. Cl. .................. 360/39; 360/41; 360/42
[51] Int. Cl.² .......................................... G11B 5/09
[58] Field of Search .................. 360/39, 40, 41, 42

[56] References Cited
UNITED STATES PATENTS
3,719,934  3/1973  Behr et al. ........................... 360/41

*Primary Examiner*—Vincent P. Canney
*Attorney, Agent, or Firm*—Nicholas Prasinos; Ronald T. Reiling

[57] ABSTRACT

In a tape drive capable of utilizing various types of magnetic tapes and encoding techniques, there is provided a system of optimally controlling read/write operations under various sets of conditions. Logic circuitry is provided to respond to tape detection means and to pre-selected conditions and/or requirements, and to select electronic circuits either singly or in combination which provide optimum read/write operation for the set of conditions then obtaining.

7 Claims, 5 Drawing Figures

SYSTEM FOR CONTROL OF READ/WRITE ON MAGNETIC TAPE

This is a continuation of application Ser. No. 331,758, filed Feb. 13, 1973.

BACKGROUND OF THE INVENTION

1. Field of the Invention

This invention relates generally to tape drives and more particularly to a system of optimally controlling read/write operations under various sets of operation conditions.

2. Discussion of the Prior Art

In a modern electronic computer system there are a number of ways of recording binary information on a magnetic surface. One commonly used method is to record bits of information on magnetic tape. Here, elementary units of magnetization of two polarities are impressed on the magnetic tape in a pattern representing either a zero or a one. There are various patterns or codes which can be used. One popular encoding system is the PE system (phase encoding). This system consists generally of a positive current transition at the bit cell center for a "one" and a negative transition for a "zero" (a bit cell is herein defined as one interval along an information track when that track is divided into several equal lengths; a bit cell may also be regarded as time periods as the track moves beneath the recording head.) With this system, despite the requisite two flux changes per bit, greater bit density is possible since the random sequence of one's and zero's and data produces wide frequency bands in NRZ type of recording (to be hereinafter described), but only about octave bandwidth for the double-pulse technique. Typically, for example, NRZ techniques may have packing densities of 800 bits per inch and bit rates of 120,000 per second, whereas phase modulation techniques reliablly generate bit packing densities up to 1600 bits per inch and bit rates of 300,000 bits per second.

Another very commonly used system of magnetic recording on a track in a magnetic medium is NRZ, or non-return-to-zero Variations of this system are the NRZ-M (non-return-to-zero-Mark), NRZ-I (non-return-to-zero-inverse), and NRZ-C (non-return-to-zero-change). In the NRZ system, generally, the current direction in the magnetic recording head is unimportant; what is important is that the current shifts from one level to another for a one so as to cause a flux to saturate at the opposite level of saturation. Hence, a one would be represented by the current in the magnetic heads switching from $+I_M$ to $-I_M$ or from $-I_M$ to $+I_M$; whereas a zero is represented by no shift. Note that in this system only one flux change per bit is required resulting in a high pulse packing density, but the system is not self-clocking, therefore a clock track must be provided along with the data tracks, or must be provided from the data (i.e. at least one bit in each frame).

It can therefore be seen that NRZ recording identifies a digit by means of a flux change, a change from one state to another normally representing a one, and no-change representing a zero; whereas in PE encoding there is a flux change which contains information in the center of the digit interval. With PE encoding we have the greatest frequency when a string of digits are the same and the least frequency when the ones and zeros alternate. Hence, with different modes of recording we have different densities of flux reversals; with PE recording we have a higher reversal rate than with NRZ recording. Since the recovered signal is proportional to the time rate-of-change of flux, the frequency of the recovered signal will be different in accordance with the type of recording used. Consequently, an amplifier which would be suitable to give optimum amplification for one signal would be unsuitable for the other.

Furthermore, as the magnetic tape recording art progressed several manufacturers developed and marketed improved chromium-dioxide tape generally referred to as high-resolution tape. Chromium-dioxide (high-resolution tape) has a higher "coercive force*" than the standard iron-oxide tape, and it also provides higher reading resolution; consequently, it can be run at higher density. Therefore, it frequently is desirous to utilize the high-resolution tape although the industry standard is the iron-oxide low-resolution tape. Once again, however, the properties of the two tapes are so different that optimum writing, for example, on high-resolution tape is achieved by utilizing a higher write current; consequently, one utilizing high-resolution tape would desire for optimum results, a lower read amplifier gain in order to present the same amplitude signal at the tape control unit. Similarly different tapes must be read differently for optimum performance. Once again it becomes obvious that different write and read circuits are necessary to achieve optimum results when utilizing the high-resolution tapes as opposed to using the low-resolution tapes.

*"Coercive force" is herein defined as the amount of magnetomotive force required to change the state of the flux on the magnetic material.

Some prior art techniques for selectively activating separate recording channels on magnetic media are to be found in the following patents: (A) J. H. Gerding — Means to Selectively Activate Separate Recording Channels — U.S. Pat. No. 3,426,338; (B) E. A. Aron — Track Selection Logic For Magnetic Storage Drum — U.S. Pat. No. 3,350,700; (C) S. O. Sampson — Track Selection Control Means for Magnetic Signal Recording and Reproducing Systems — U.S. Pat. No. 3,315,041; (D) T. W. Holland — Means to Utilize a Conductive Strip on a Magnetic Tape as an Indexing Device — U.S. Pat. No. 3,376,564; (E) J. D. Meng — Electro-Optical Apparatus and Circuit for Sensing Reflective Areas or Appertures in Tape — U.S. Pat. No. 3,290,509. The first three of these patents pertain to track selection; whereas in the last two patents, a reflective patch is affixed on the magnetic tape and sensed to indicate when the end of the tape is approaching. Whereas these devices function to accomplish a specific task they do not appear capable of performing the various selection tasks required by the impact of advancing tape-recording technology.

Accordingly, it is a primary object of the present invention to provide an improved system for control of read/write on magnetic tape.

It is a more specific object of the invention to provide tape detection means for responding to pre-selected conditions and/or requirements, to selectively activate electronic circuits either singly or in combination to provide optimum read/write operation for the set of conditions that are prevailing.

It is still a further specific object of the invention to provide improved circuits for control of read/write on magnetic tape.

It is still another more specific object of the invention to provide a read amplifier gain switch by logic signal.

It is yet another more specific object of the invention to provide an improved tape drive system that can utilize either high-resolution tape or low-resolution tape.

SUMMARY OF THE INVENTION

The foregoing objects of the invention are obtained by a tape providing a tape drive capable of utilizing chromium-dioxide (high-resolution tape) and iron-oxide (low-resolution tape). Furthermore, there is provided a system of optimally controlling read/write operations under various sets of conditions.

High resolution tape is identified by containing an extra reflective patch forward of the normal beginning-of-tape-marker. The extra reflective patch is sensed by a photo detector which provides a signal identifying the condition that high resolution tape is in use. Logic circuitry is further provided to respond to the signal and optimize the read/write circuits for the particular type of tape. For example, it might be necessary to (a) change the amount of write current utilized during the recording and (b) alter the gain of the read amplifier during the playback operation.

The general conditions to which this system responds are as follows:

1. NRZ code has been selected for reading or writing;
2. PE code with low resolution tape has been selected for reading or writing; or that
3. PE Code with high resolution tape has been selected, for reading or writing.

The above and other objects of the invention are achieved in an illustrative embodiment described hereinafter. All features which are believed to be characteristic of the invention, both as to its organization and method of operation together with further objects and advantages thereof will be better understood from the following description considered in connection with the accompanying drawings. It is to be expressly understood, however, these drawings are for the purpose of illustration and description only and are not intended as a definition of the limits of the invention.

BRIEF DESCRIPTION OF THE DRAWINGS

FIG. 2A is the logic block diagram for the read operation while FIG. 2B is the logic block diagram for the write operation.

GENERAL DISCUSSION OF THE INVENTION

Figure 1:
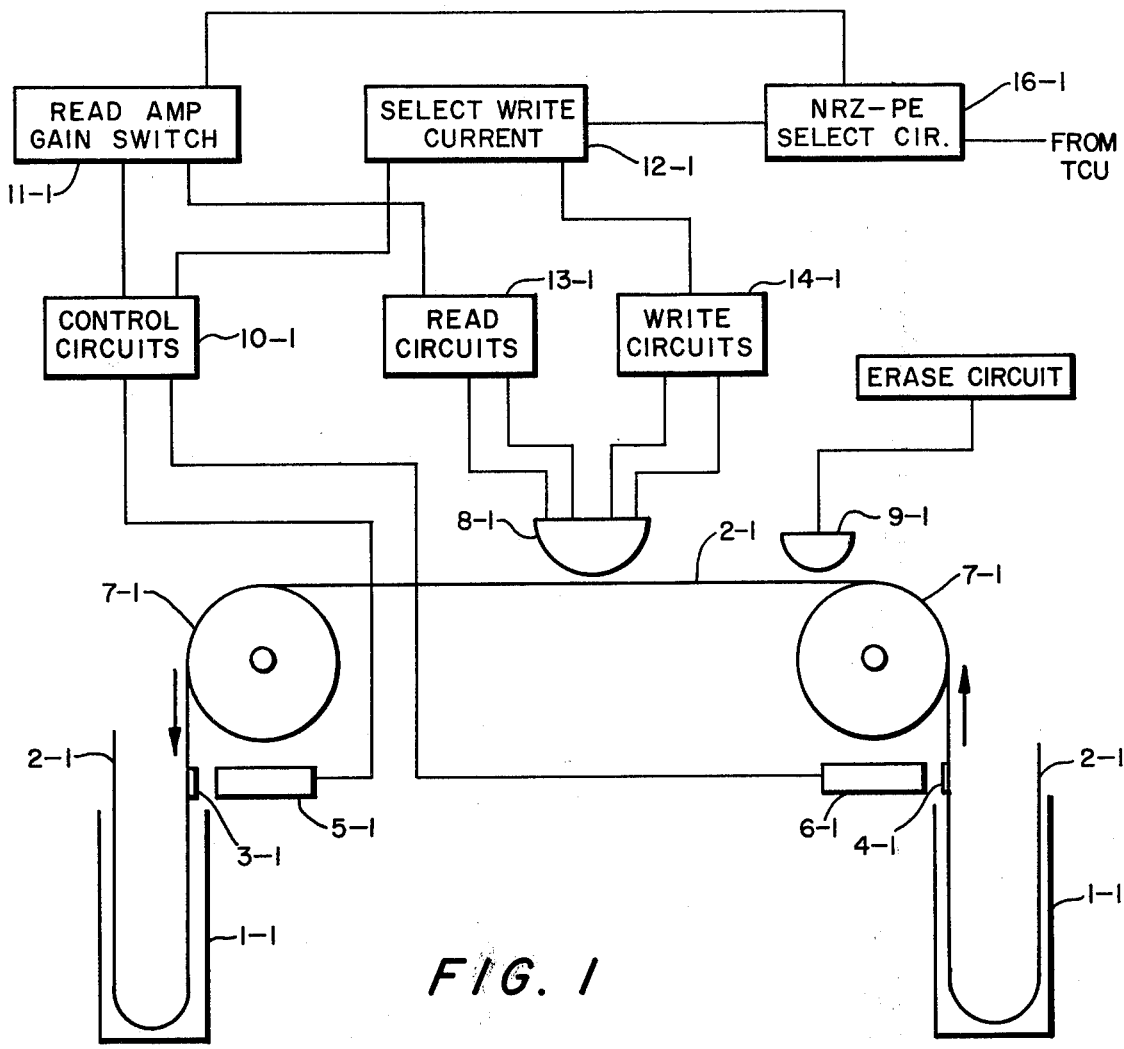
FIG. 1 is a block diagram illustrating the system for control of read/write on magnetic tape in accordance with the preferred embodiment of the invention.

The magnetic tape transport system of FIG. 1 consists generally of a magnetic tape 2-1 which is being driven by a pair of pneumatic-drive capstans 7-1, past the data transfer means which comprise for example a head 9-1 which is adapted for erasing purposes and a read/write head 8-1 adapted either for writing out of, or on to a magnetic storage medium such as magnetic tape 2-1. Reflective patches such as for example small metallic elements 3-1 may be permanently affixed to the tape either singly or in a code pattern to identify the type of tape used. As has been previously described, there is available on the market two types of tape, one of which has a composition predominantly of chromium-dioxide and the other has a composition predominantly of iron-oxide. The chromium-dioxide type has for the purposes of this disclosure, been termed high resolution tape. Furthermore in this system a reflective patch on the tape forward of but not aligned with a beginning-of-tape marker signifies that it is high resolution tape, although any other convention such as the absence of the reflective patch or two reflective patches could have signified high resolution tape. For high resolution tape, therefore, a reflective patch 3-1 positioned in front of, or forward of the beginning-of-tape-patch 4-1 (but not in alignment therewith) will be detected by a photo-detector 5-1 (although other detection means may be utilized) indicating that high resolution tape is on the tape drive. Tape loop chambers 1-1 provide means for holding slack tape and sensing a change of speed or direction in the tape drive.

Cooperating with the various data transfer heads 8-1 and 9-1 and with the detectors 5-1 and 6-1 are suitable control circuits 10-1, read circuits 13-1, write circuits 14-1, read amplifier gain-switch circuits 11-1, select write current circuits 12-1 and NRZ-PE select circuits 16-1. These circuits represented by blocks are shown in greater detail on FIGS. 2 to 4. For example on FIG. 2a, the logic block diagram of control circuits 10-1 are enclosed with the dashed lines and the entire circuit is labeled 10-1. Similarly, read amplifier gain switch 11-1 is enclosed in dashed lines and also labeled 11-1. This procedure is carried out through the remainder of the figures.

The herein described system is capable of operating in various modes as summarized in table I below entitled "Modes of Operation":

TABLE I

| | | MODES OF OPERATION | | | | |
|---|---|---|---|---|---|---|
| Condition | Read | Write | NRZ | PE | Hi-Resolution | LO-Resolution |
| 1 | T | F | T | F | F | T |
| 2 | F | T | T | F | F | T |
| 3 | T | F | F | T | T | F |
| 4 | F | T | F | T | T | F |
| 5 | T | F | F | T | F | T |
| 6 | F | T | F | T | F | T | where T = true and F = False

Assume as an example that the operator has selected the PE code, and has placed a low resolution tape on the tape drive; consequently, there will not be a reflective patch on the tape at position 3-1, and therefore signifying this is low resolution tape; but there will be a reflective patch on the tape at position 4-1 signifying the beginning of tape marker. The patch sensor at 5-1 will have no output; therefore, the control circuits 10-1 coupled to the tape sensor 5-1 and 6-1, will signal the read amplifier gain switch circuits 11-1 to select the correct read circuits for the proper gain for low-resolution tape. At the same time the control circuits 10-1 will signal the select write current switch circuits 12-1 to select the proper write circuits 14-1 to provide optimum write current for low-resolution tape.

Prior to proceeding to a more detailed description of the structure and operation of the various circuits in the system, the following terms will be defined.

Function line — a line carrying a signal that is accorded binary significance i.e. to represent data or control information. Signals are generally in the form of logic levels, although pulse signals may be used. The signals on these lines are for the purposes of this disclosure termed functions. Table II lists mnemonic code for the function and its definition of the function it performs.

TRHRD1Z will be low and will remain low so long as low resolution tape remains on the drive. As a result no control functions are performed for read amplifier or write amplifier and selection is performed by NRZ-PE select circuit 16-1 shown on FIGS. 2A and 2B. (Circuit 16-1 is the same in both FIGS. A and B; however, in FIG. 2A that portion of the output circuit coupled to the read circuits 13-1 is shown while in FIG. 2B that portion of its output circuit coupled to select-write current circuit 12-1 is shown). With NRZ selected, function TDPEX30 will be low; this signal will be applied to inverter 113 through gate 112 of FIG. 2A whereupon an inverted signal TWPEX40 will be applied to terminal 33; the inverted signal at the output of inverter 113 will also be applied again to another inverter 115 through gate 116 and the output function TWPEX50 will be applied to terminal 34.1. Since TDPEX30 which was low initially was inverted once as

TABLE II

| Function | Definition |
| --- | --- |
| TDPEX30 | Input to the tape drive from the TCU (tape control unit); signals tape drive whether PE or NRZ recording is to be carried out and sets up the state of the function. It is low for NRZ code. |
| TWPEX40 | Enables or disables PE switch; Enabled when function is low. |
| TWPEX50 | Enables or disables NRZ switch. Enabled when function is low. |
| TRPA(X)OS | Read preamplifier track X. |
| TRRGL10 | Read gain set to low for high resolution tape. It is gain selection function line for PE amplifier. |
| TWWPR00 | Write protect--protection function line must be at ground before any writing on the tape can proceed. |
| TWWSS00 | Write select. Informs system when to write. (This function is ground enabled). |
| TWWCC10 | Write current control; selects the amount of current to be used. |
| TRHRD1Z | High resolution tape detection function; indicates that high resolution tape has been placed on the drive and is active when the tape is at beginning of tape. It is activated by means of the reflective patch forward of but not in alignment with the normal beginning-of-tape patch on the tape. |
| T2BTX1Z | Beginning of tape detect function indicates that tape drive state is at the beginning of tape. |
| TRHRT10 | High resolution tape function; it is high when high resolution tape has been placed on the tape drive and the tape drive is ready to write. |
| TRHRT00 | Not high resolution tape function; this function is high only for low resolution tape and is always the complement of function TRHRT10. |
| TRH1P10 | Drive ready; tape drive ready to be operated. |
| TRUNL10 | Unload tape; it is high when tape is unloaded. |
| TWHCB10 | High current boost; provides higher than normal write current to erase portion of tape. |
| T2H1P1T | Tape drive ready; originates from ready circuits within tape drives and is applied to function TRH1P10 converts a contact circuit to logical output. |
| XNU | Test function, when not used is always high. |

DETAILED DESCRIPTION OF A PREFERRED EMBODIMENT

Figure 2A:
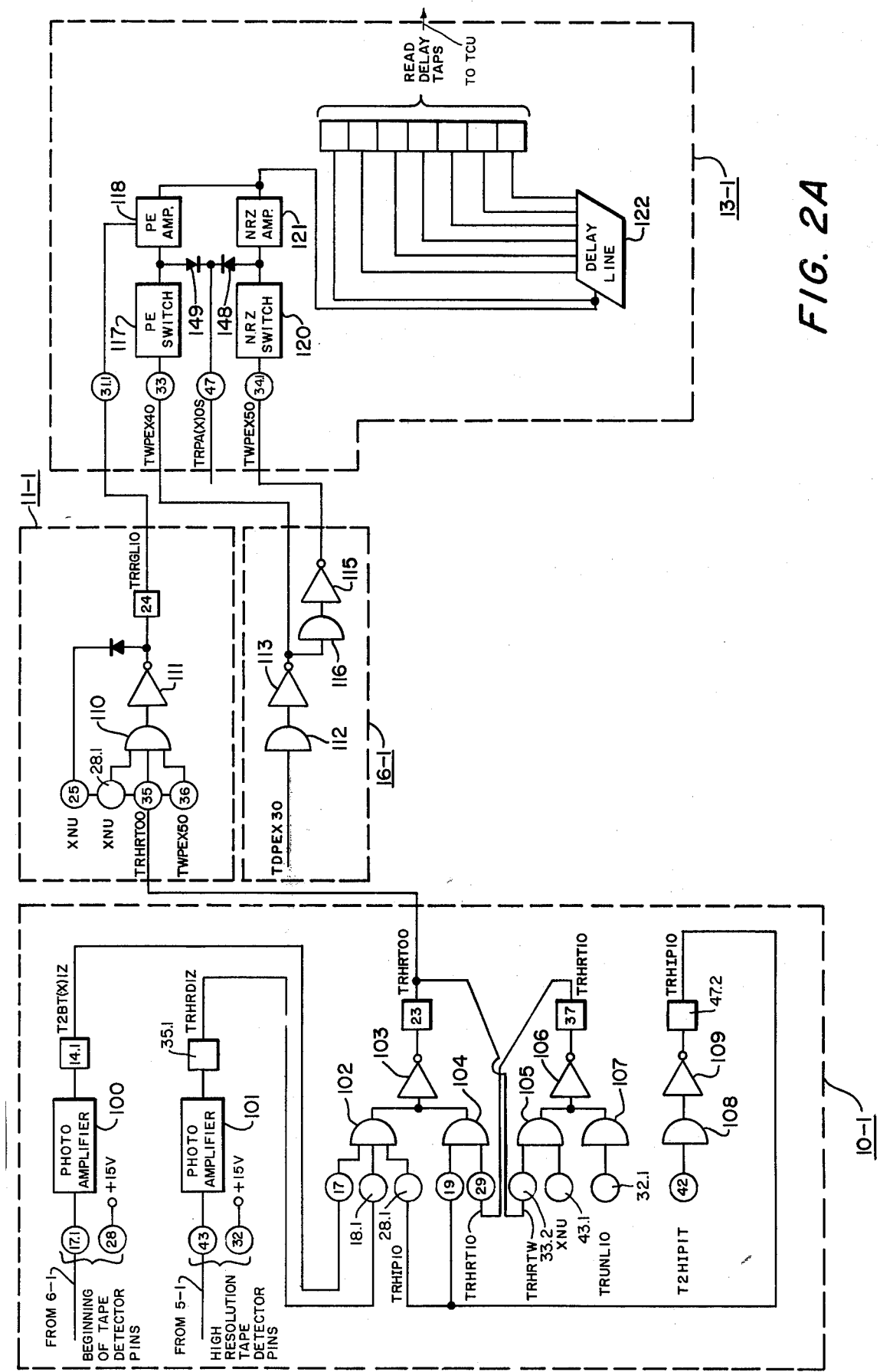
FIGS. 2A and 2B show in logic block diagram form a preferred embodiment for the system for control of read/write on magnetic tape.

Referring now to FIGS. 1 and 2a and Tables I and II and assuming that NRZ code has been selected to be read from low resolution tape, it will be seen that this corresponds to condition 1 of Table I. Referring to FIG. 2a and FIG. 1, a signal from beginning of tape detector 6-1 will be applied to beginning of tape detector terminals 17.1 and 28 (the word terminal will be used interchangeably with PIN in this disclosure) and will be amplified by photo-amplifier 100 and will be available at terminal 14.1; therefore, function T2BT(X)1Z will be high and will be applied to terminal 17 of AND gate 102. However, there will be no signal applied to high resolution tape detector 5-1 consequently high resolution tape detector terminals 43 and 32 will be low and terminal 35.1 will be also low; hence, function function TWPEX40, this function will be high; also since TDPEX30 was inverted twice through inverters 113 and 115 function TWPEX50 will be low. Inasmuch as NRZ switch 120 requires a low input to be enabled, NRZ switch 120 will be selected which will select NRZ amplifier 121. Since TWPEX40 which is high is applied to PIN 33 and subsequently to PE switch 117, this switch is not selected and PE amplifier 118 is disabled. A signal TRPA(X)OS from read head 8-1 is applied to terminal 47 and subsequently to NRZ amplifier 121 through diode 148. The signal is then amplified by NRZ amplifier 121 and applied to delay line 122 where de-skewing* operations take place. Following the delay line, the signal is then amplified by means not shown and passed out to the tape control unit (TCU) not shown.

*De-skewing is the alignment of the time of the output pulses from a single frame so that all pulses ideally occur simultaneously.

Figure 2B:
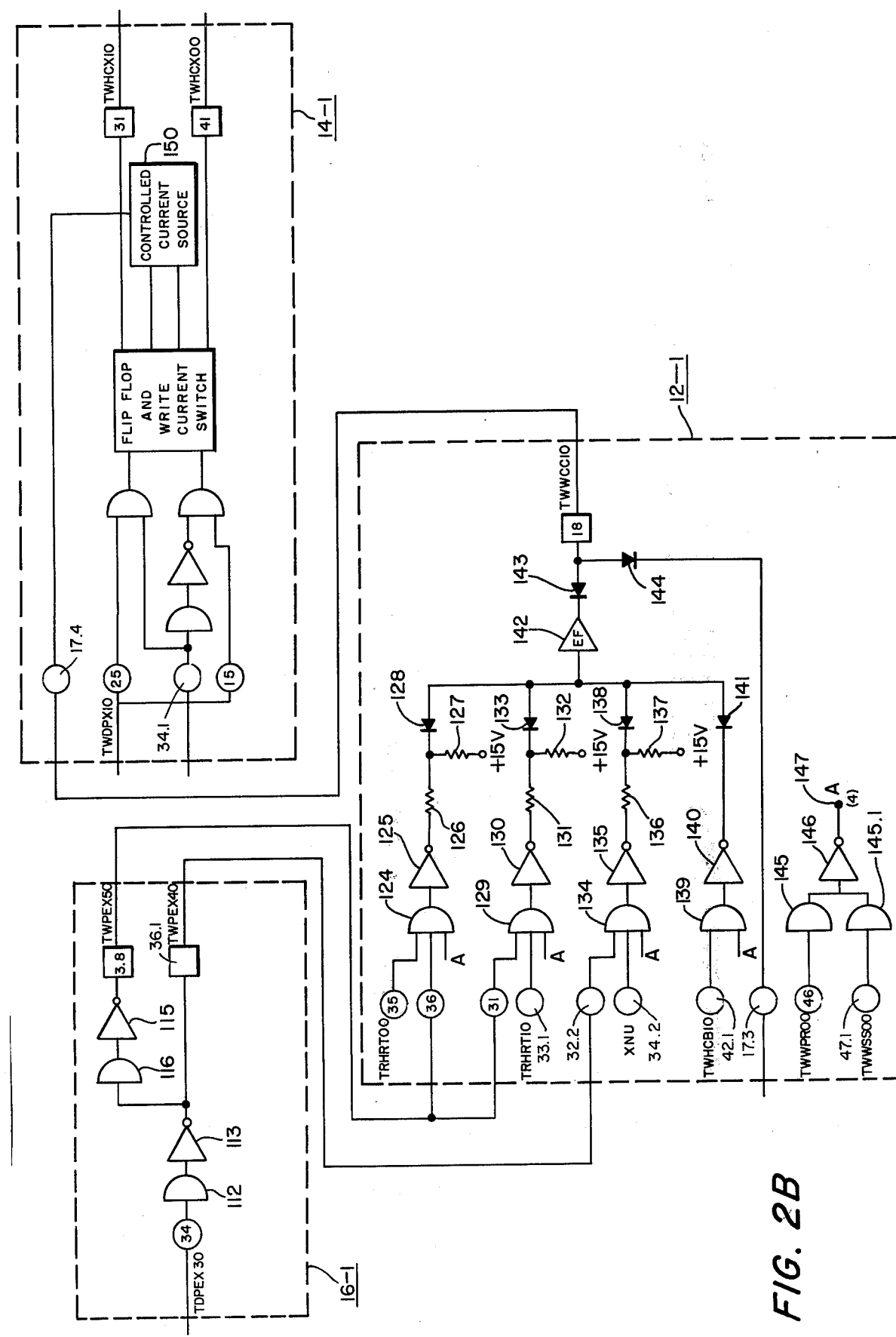

Assuming now that it is desired to write information on the tape with the conditions as given above, i.e. NRZ code is selected low resolution tape is on the tape drive, and it is desired to write; this set of conditions is number 2 on Table I. Once again, the control circuits perform no control functions on read or write amplifiers (See above discussion). Referring therefore to FIG. 2B, function TDPEX30 will once again be low, and this signal is applied through PIN 34 and gate 112 to inverter 113; the output of inverter 113 is applied directly to PIN 36.1 as function TWPEX40 which is now high, and is also applied to inverter 115 through gate 116 whereupon it is inverted by inverter 115 and applied to PIN 38 as function TWPEX50 which is now low. Functions TWPEX40 and TWPEX50 are then applied to select write current circuitry 12-1 via PINS 32.2, 31 and 36 respectively, thus the signal applied to PIN 31 and PIN 36 is low, and the signal applied to PIN 32.2 is high. Thus, the NRZ-PE select circuit 16-1 has selected AND gate 134 but has not selected AND gates 124 and 129. With AND gate 134 selected and PINS 32.2 and 34.2 high, the gate will go high and be enabled whenever terminal A is also high. Input signal A is derived from inverter 146 which in turn is controlled by gates 145 and 145.1. The input functions to Gates 145 and 145.1 are TWWPR00 and TWWSS00 respectively which must be at ground before any writing on the tape can proceed; (the purpose of functions TWWPR00 and TWWSS00 is to prevent writing on a tape which has been previously recorded unless it is desired so to do.) Thus with PINS 46 and 47.1 at ground, the signal applied to inverter 146 through gates 145 and 145.1 will be low which will cause the output signal A to be high. Since A is high and AND gate 134 has been selected, it will now be enabled and a high signal would be applied to inverter 135. The output signal of inverter 135 will be low and will be applied to a voltage divider comprised of resistor 136 and resistor 137 which in turn is connected to plus 15 volts. A diode 138 having its cathode coupled to the junction of resistors 136 and 137, and its anode coupled to an emitter follower 142 sets up a potential at the emitter follower. The potential at the emitter of the emitter follower 142 is applied to diode 143 which has its cathode coupled to the output of emitter follower 142, and its anode coupled to PIN 18 and is then transmitted through pin 18 as function TWWCC10 to write circuits 14-1 via PIN 17.4. The level of TWWCC10 function selects the amount of write current that is to be used and the write current increases as this level goes toward ground; consequently, the value of the potential selected by the voltage divider 136 and 137 will determine the amount of write current to be used. With condition 2 of Table I, the voltage divider formed by resistors 136 and 137 has been selected to have a value which will provide the correct potential for TWWCC10 for NRZ write current.

Referring to Table I, it will be seen that the next condition to be satisfied is condition 3 wherein it is required to read a phase-encoded (PE) high-resolution tape. The operator selects the PE code by a thumb-wheel located on the tape control unit (not shown) and also by placing a high-resolution tape on the tape drive. As previously described, the high-resolution tape is identified by an extra reflective patch affixed on the tape forward of but not in alignment with the normal beginning-of-tape marker. The reflective patch 3-1 transmits a signal to high-resolution tape detector 5-1 which is applied to the photo-amplifier 101 of FIG. 2A. The photo-amplifier 101 amplifies the signal and provides output signal TRHRD1Z which indicates that high-resolution tape has been placed on the tape drive and is active when the tape is at beginning of tape. At the same time, the beginning of tape detector 6-1 will also provide a signal through PIN 17.1 to the photo-amplifier 100 which in turn amplifies that signal and provides an output signal T2BT(X)1Z at PIN 14.1. Functions TRHRD1Z and T2BT(X)1Z will be applied to terminals 18.1 and 17 of AND gate 102; also function TRHIP10 which is high when tape drive is ready to operate is applied to terminal 28.1 of AND gate 102. Hence, with all the input terminals of AND gate 102 high, it will be enabled and an input high signal will be applied to inverter 103 which will provide an output signal TRHRT00 at PIN 23 which will be low. Function TRHRT00 is also transmitted to one leg of AND gate 105 through PIN 33.2. However function XNU (not used here) is high; with function XNU high and with function TRHRT00 low, AND gate 105 will provide a low output signal to inverter 106 which in turn provides a high output signal TRHRT10 at PIN 37. This condition will prevail as long as high-resolution tape is on the drive, and the drive is in operating condition. Since it is desired to read the PE code on the high-resolution tape, and function TRHRT00 has been set low, this function is applied to read amplifier gain setting circuits 11-1 via input terminal 35 of AND gate 110. At the same time, TWPEX50 is applied to PIN 36 of AND gate 110. (PINS 35 and 36 of FIGS. 2A and 2B are identical and have more than one circuit coupled to them as shown).

Figure 3:
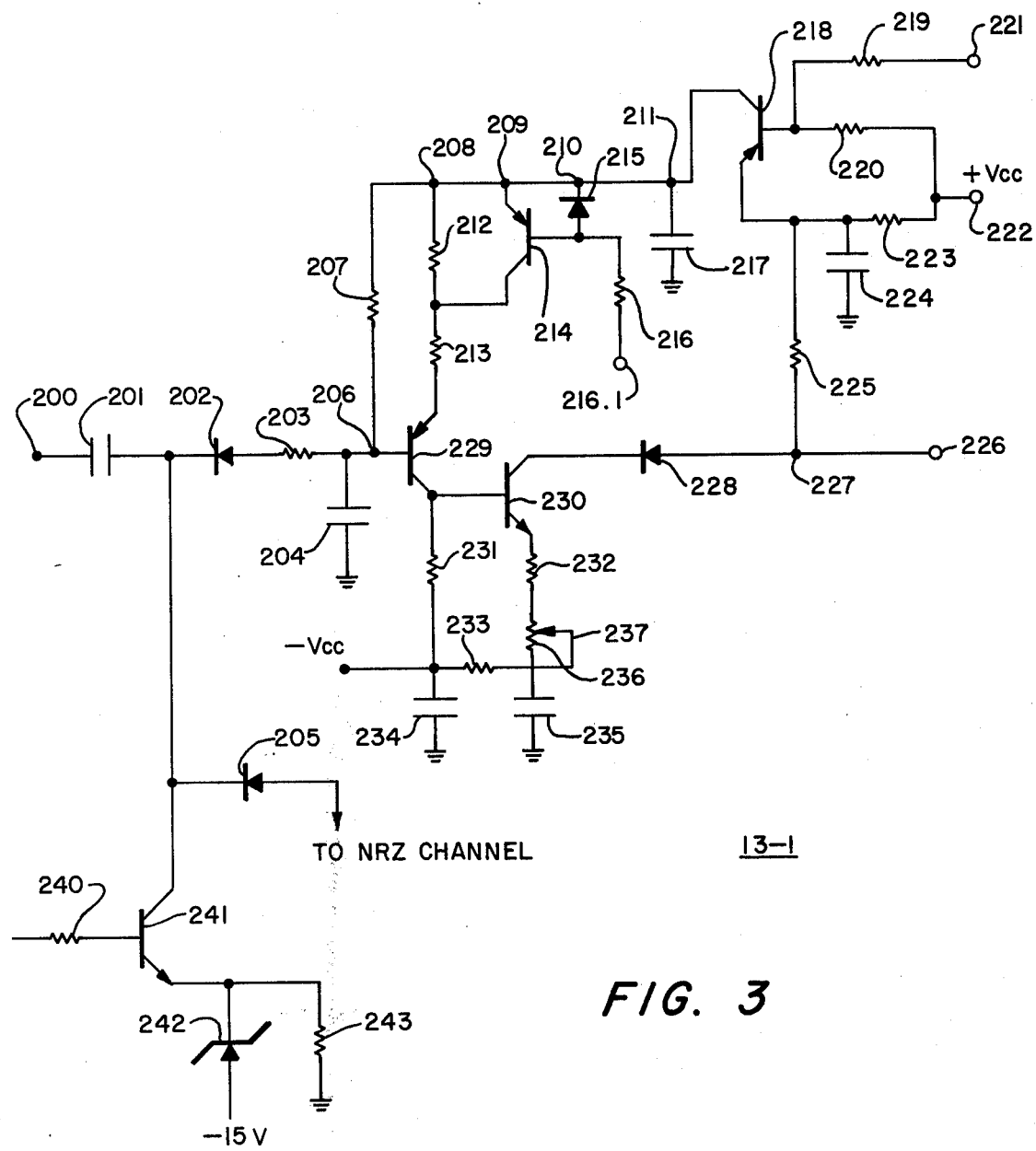
FIG. 3 is a schematic equivalent circuit of the selectable gain read amplifier by logic signal.

Referring to FIG. 2A block 13-1 and FIG. 3 Block 13-1, transistor 214 must be off in order to lower the gain of the read amplifier, which occurs because resistor 212 is inserted into the emitter circuit of transistor 229. For transistor 214 to be off the terminal 216.1 must be high. This terminal is also PIN 31.1 of FIG. 2A (13-1) i.e. TRRGL10 must be high. To obtain this the input to inverter 111 from gate 110 must be down, and this condition obtaining when TRHRT00 is down. With high-resolution tape on the system TDHRT00 must be down since both photo-amplifiers are high. In this case TDPEX30 is high since PE has been selected. However, TDHRT00 keeps the gate down. With this one input of AND gate 110 low, the input to inverter 111 will be low and the output from inverter 111 will be high and will be applied to PIN 24 as function TRRGL10 which is high. Function TRRGL10 is applied to read circuits 13-1 via PIN 31.1. At the same time, since PE code has been selected function TDPEX30 will be high which is applied to the input of Gate 112 and provides a high output which in turn is applied to the input of inverter 113; inverter 113 provides an output function TWPEX40 which is applied to PIN 33 of PE switch 117. The output from inverter 113 is also applied to the input of inverter 115 via gate 116 whereupon inverter 115 provides an output function TWPEX50 which is now high and is applied to pin 34.1 of NRZ switch 120, thus disabling NRZ amplifier 121. Function TWPEX40 (which is ground enabled) enables PE switch 117 thus enabling PE amplifier 118. Since high resolution tape is on the tape drive (not shown), it is required that a gate (not shown) of amplifier 118 be set lower than for low resolution tape; and this is accomplished by function TRRGL10 which is also applied to PE amplifier 118 and sets the gate low.

A signal TRPA(X)OS from read head 8-1 is applied to PE amplifier 118 through diode 149 which has its cathode connected to PIN 47, and its anode connected to the input of PE amplifier 118. A proper amplification is accorded the signal and is then applied to delay line 122 wherein a delay correction is made and is then transmitted to tape control unit (TCU).

Condition 4 of Table 1 has the same conditions as the above described operation, but it is required to write on high resolution tape rather than read. Referring to FIG. 2B once again, function TDPEX30 will be high which as has previously been described will set function TWPEX40 low and function TWPEX50 high. These functions will be applied to control circuits 12-1 via terminals 31, 32.2 and 36. As herein above described, for a write application the signal A on output terminal 147 will be high and will be applied to AND gates 124, 129, 134 and 139. Furthermore, since high resolution tape is on the tape drive, function TRHRT10 will be high and since function TWPEX50 which is high is applied to terminal 31 of AND gate 129, all of the input terminals of AND gate 129 are high which enables the AND gate providing a high input to inverter 130 which in turn provides a low output to the voltage divider comprised of resistors 131 and 132. The resistors 131 and 132 are selected to provide the proper voltage to diode 133 that Phase Encoding with high resolution tape requires. It will once again be noted that resistor 132 is coupled at one end to +15 volts and is also coupled at its junction with resistor 131 to the cathode of diode 133 whereas the anode of diode 133 is coupled to the input of emitter follower 142. Therefore, diode 133 will permit the application of the voltage level obtained from the voltage divider to the input of emitter follower 142 which in turn provides an output signal to diode 143 and thence to PIN 18. The output signal function TWWCC10 is applied to write circuits 14-1 via terminal 17.4 which in turn is coupled to control current source 150. Since by the proper selection of the values of resistors 131 and 132, function TWWCC10 has been set to provide the correct write current for high resolution tape, and since function TWWCC10 has been logically switched to the control current source 150, proper current has been selected for the write operation to satisfy condition 4 of Table I.

Condition 5 of Table I requires that phase-encoded (PE) low-resolution tape be read. Referring to FIG. 2A and by the reasoning previously developed, it will be noted that function TRHRD1Z will be low since high resolution tape is not now on the tape drive and function T2BT(X)1Z will be high indicating that the photo-amplifier detector 6-1 has sensed the beginning of tape patch 4-1. Function T2BT(X)1Z which is high is applied to PIN 17 one input of AND gate 102; function TRHRD1Z which is low is applied to PIN 18.1 of another input of AND gate 102; and since this function will stay low so long as there is low-resolution tape on the tape drive AND gate 102 will not be enabled and its output will be low; hence, inverter will invert this low signal to a high signal TRHRT00 which signifies that low resolution tape is on the tape drive. Function TRHRT00 is further applied to input terminal 33.2 of AND gate 105; furthermore, since function XNU, which here is high because it is not used here, (XNU is always high when not used) is applied to the other terminal of AND gate 105 through PIN 43.1, AND gate 105 is enabled and provides a high input for inverter 106 which inverts the high input to a low output TRHRT10. This in turn is applied to PIN 29 of ANd gate 104; therefore, both inputs of AND gate 104 are low which maintains the low input for inverter 103 providing the high output signal TRHRT00, and signifying low resolution tape is now on the tape drive. Function TRHRT00 is applied to read amplifier gain switch circuits 11-1 via terminal 35. AND gate 110 now has all high inputs signals on its input terminals as follows XNU on terminal 28.1, TRHRT00 on PIN 35 and TWPEX50 on PIN 36 thus driving inverter 111 low and providing an output signal TRRGL10 which is low. This signal is applied to PIN 31-1 of block and sets the (PE) phase encoded amplifier 118 to the high gain state. This is accomplished by turning on transistor 214 (shown on FIG. 3) which shorts circuits resistor 212 increasing the gain. (It will be noted that PE amplifier has been previously selected by the PE switch 117 in a manner indicated in the earlier discussion of the phase encoder.) Therefore, a signal TRPA(X)OS applied to PIN 47 from the read head will once again be applied to PE amplifier 118 via diode 149 and thence to the delay line 122, where skew correction is accomplished and the signal is then transmitted to TCU (not shown).

Condition 6 of TABLE I is identical with condition 5 with the exception that phase encoded low resolution tape is to be written on instead of read from. Referring now to FIG. 2B, function TDPEX30 is high causing function TWPEX40 to be low and TWPEX50 to be high. Once again as above function TRHRT00 of PIN 35 of AND gate 124 will be high and function TRHRT10 on PIN 33.1 of AND gate 129 will be low. Under these conditions gate 124 will be high if A is high and inverter output off inverter 125 will be low. Thus the voltage divider resistor 126 and 127 will be selected, and diode 128 will transmit this potential to the emitter follower 142 the emitter of which will transmit its potential through diode 143 to PIN 18 as function TWWCC10 to the write circuits 14-1 as previously stated.

To summarize, the amount of write current is determined by the difference in level between +15 volts and the level at PIN 18 (TWWCC10) of 12-1. The write current increases as this difference becomes larger. The level at PIN 18 of 12-1 is in turn determined by the voltage derived from the voltage divider and applied to the base of the emitter follower 142. These voltage dividers have been previously set to provide the correct write current for the conditions desired, and the particular voltage is then selected by the logic on the inputs to the gates of 12-1.

Upon initiating the first write command following a non write type of operation, it is necessary to erase that portion of tape between the erase head and the write head. To accomplish this TWHCB10 is applied to PIN 42.1. This function will go high and remain high for a short time. It energizes gate 139 driving inverter 140 low, thus connecting diode 141 to the emitter follower 142, thus providing a higher current than normal at the control current source 150.

Referring to FIG. 3, there is shown a schematic diagram of the phase encoded half of the read amplifier. This half of the amplifier labeled 13-1 on FIG. 1 is selected by means of a ground signal on input terminal 221. When the input terminal at 221 is coupled to ground by means of external selection circuits, resistor 219 applies this signal through the base of PNP resistor 218 thus causing transistor to turn on i.e. become conducting. $+V_{cc}$ applied at terminal 222 is incident on condenser 224 via resistor 223 coupled to it. Resistor 223 coupled to capacitor 224 provides two functions as follows: (A) drops the voltage to the output of that required by the operation of the amplifier and (B) to provide filtering. When transistor 218 is switched to its ON state, its collector will assume approximately the same potential as the emitter; consequently, the voltage determined by the drop through resistor 223 will also be incident on the collector side of transistor 218. The voltage at collector 218 will then depend on the load that the collector sees in the circuit following. Starting at the collector of transistor 218, further filtering is provided by condenser 217 coupled to the collector circuit at junction 211. Since transistor 218 is in its ON-state, current from terminal 222 will flow through resistor 223 through transistor 218 on to the collector circuit of transistor 218 and into junctions 211, 210, 209, and 208 and through resistor 207 which is applied to the base of transistor 229, thus turning on transistor 229 and causing current to flow through resistors 212 and 213 coupled to the collector circuit of transistor 218 and to the emitter of PNP transistor 229. Current will also be caused to flow through the collector of transistor 229 to the load resistor 231 and out through the terminal labeled $\mp V_{CC}$ which is coupled to the collector of transistor 229. Base current from transistor 229 is added to the current flowing through resistor 207 at junction 206 and flows through resistor 203 diode 202 and through NPN transistor 241 and down through zener diode 242. Zener diode 242 is maintained in an ON state by means of resistor 243 one side of which is coupled to the cathode of diode 242, and the other is coupled to ground. Referring now back to the collector circuit of PNP transistor 229, it will be noted that current will flow through resistor 231 and to the base of NPN transistor 230 turning transistor 230 to the ON state and causing current to flow in its collector and emitter circuit. Tracing this current it will be noted that the current originates at the junction of capacitor 224 and resistor 223 and flows through resistor 225 which is the collector load resistor for transistor 230. Resistor 225 is coupled to the collector of transistor 230 via a diode 228, therefore, current flows through diode 228 into the collector of transistor 230 and out through the emitter of transistor 230 and through resistors 232, 236 and 237 which are coupled to the emitter of transistor 230. Resistor 236 is a potentiometer connected as a rheostat with arm 237 used to control or set the gain of this channel of the amplifier. Still tracing the current of the emitter circuit, it will be noted that it continues to flow through the potentiometer arm 237 and through resistor 233 and to the negative supply $-V_{CC}$. Condensers 234 and 235 coupled to either side of resistor 233 and to ground provide further filtering, i.e. condenser 234 primarily filters the $-V_{CC}$ supply whereas condenser 235 filters the emitter return of transistor 230 and is of such a large value that resistor 233 does not affect the gain of this stage. Resistor 233 provides a voltage drop such that the operating potential or the voltage across resistors 232 and 233 is substantially the correct amount for the gain desired. Output terminal 226 coupled to the junction 227 of resistor 225 and the anode of diode 228 is also coupled to the delay line 122 shown in block 13-1 of FIG. 2A.

The signal for this amplifier is applied at terminal 200 and enters the circuit through capacitor 201 through diode 202 (which as previously discussed has been turned on) and through resistor 203 and is applied to the base of transistor 229. It is amplified by transistor 229 and is applied through the collector of transistor 229 to the base of transistor 230 and is amplified once again and further applied through diode 228 to the output terminal 226. The gain of this particular channel will be dependent on resistors 212, 213 and on resistors 231, 232 and 236. The gain of the circuit may be increased by decreasing the value of resistor 212. The switchable gain feature, then, is accomplished by shorting out resistor 212 by means of an external signal on transistor 214. It will be noted that PNP transistor 214 has its collector coupled at the junction of resistors 212 and 213 and its emitter coupled to the junction 209, thus providing a parallel circuit around resistor 212. Thus, when an external logical signal TRRGL10 from block 11-1 is applied to transistor 214 at terminal 216.1 of FIG. 3 transistor 214 will be turned on. Thus point 216.1 which is coupled to ground essentially shorts out resistor 212 and increases the gain of the channel. When resistor 216 is coupled to a voltage somewhat higher than the operating potential at junction 209, transistor 214 is turned off thus inserting resistor 212 into the circuit and lowering the gain. Diode 215 with its anode coupled to the base circuit of transistor 214 and its cathode coupled to the collector of transistor 218 provides a base emitter junction over-voltage protection to transistor 214 at those times when it is turned off.

The NRZ channel of the amplifier coupled to the PE channel via diode 205 is similar in its operation and is described in greater detail in U.S. application Ser. No. 33,029 filed on 4/29/70 assigned to the same assignee as the instant invention.

Figure 4:
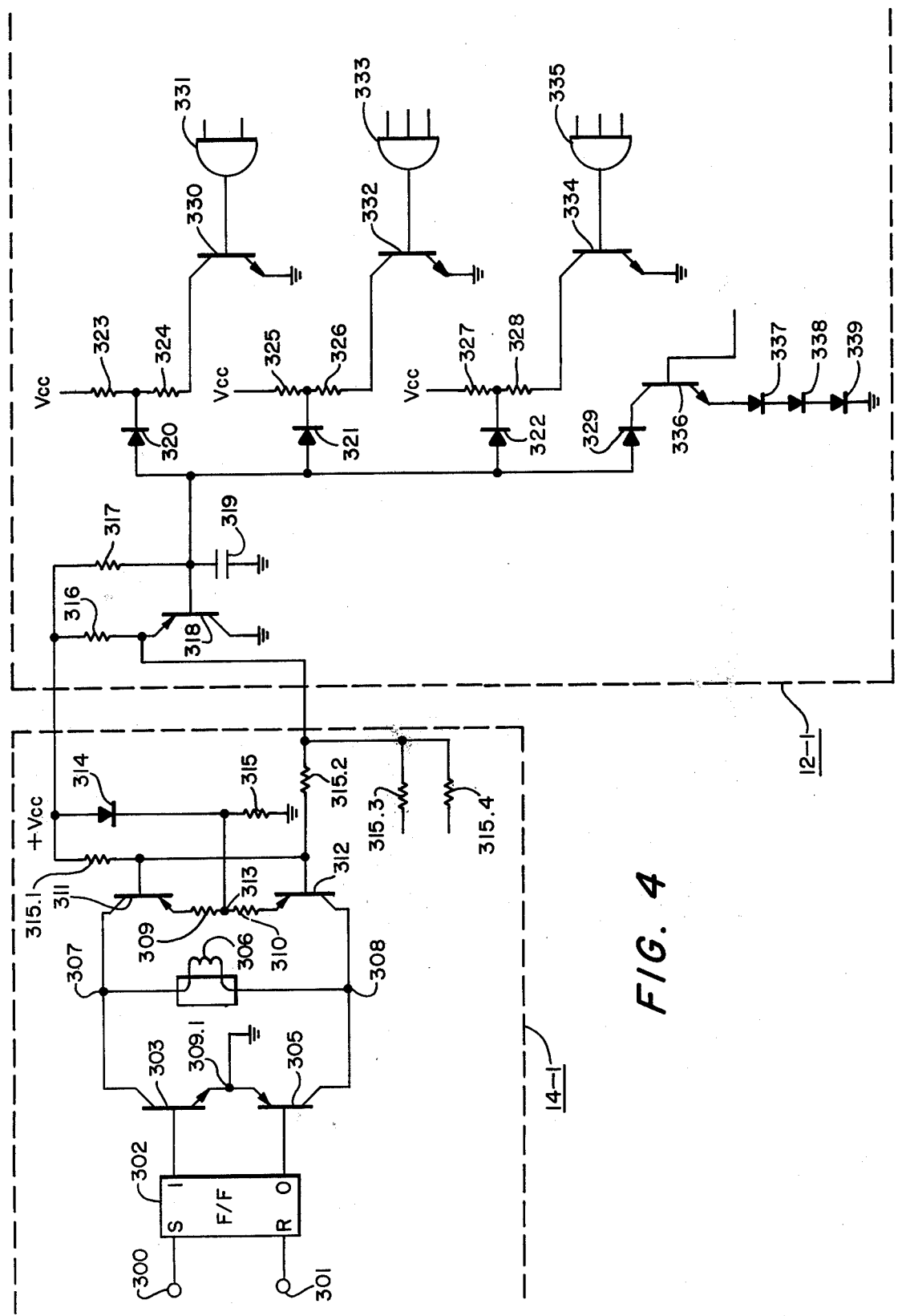
FIG. 4 is a schematic of an equivalent circuit for control of read/write on magnetic tape.

Referring to FIG. 4, a flip-flop 302 has a "set" and "reset" input connected to it at terminals 300 and 301 respectively. The "1" terminal of flip-flop 302 is coupled to the base of transistor 303 and the "0" terminal of flip-flop 302 is coupled to the base of transistor 305. A write head 306 is coupled to the collector of NPN transistor 303 at the junction 307 and is also coupled to the collector of PNP transistor 305 at the junction 308. The emitters of transistors 303 and 305 respectively are grounded at the junction 309.1. PNP transistor 311 has its base coupled to the base of transistor 303 at junction 307 and PNP transistor 312 has its collector coupled to the collector of NPN transistor 305 at junction 308. The emitter of transistor 311 is coupled to one side of resistor 309 whereas the other side of resistor 309 is coupled to junction 313; the emitter of transistor 312 is also coupled to resistor 310 add the junction 313. Junction 313 is coupled to ground through resistor 315 and is also coupled to $+V_{CC}$ terminal through diode 314. The bases of transistors 311 and 312 are coupled together which are then coupled to $+V_{CC}$ terminal through resistor 315.1, and are also coupled to the emitter of PNP transistor 318 through resistor 315.2. The emitter of PNP transistor 318 is further coupled to $+V_{CC}$ terminal through resistor 316 whereas the collector of transistor 318 is grounded. The base of transistor 318 is coupled to ground through capacitor 319 and is also coupled to $+V_{CC}$ terminal through resistor 317; it is further coupled in parallel to the anodes of diodes 320, 321, 322 and 329 respectively, whereas the cathodes of diodes 320, 321 and 322 are coupled to $V_{CC}$ through resistors 323, 325 and 327 respectively. They are also coupled to the collectors of NPN transistors 330, 332 and 334 respectively through resistors 324, 326 and 328 respectively. The cathode of diode 329 is coupled to the collector of a transistor 336. The emitters of transistors 330, 332 and 334 are respectively grounded, whereas the bases of these transistors are coupled to AND gates 331, 333, and 335 respectively. The collector of transistor 336 is coupled in series to diodes 337, 338 and 339 and is eventually grounded.

Referring now to transistors 311 and 312 it will be noted that these constitute essentially means for providing a constant current source. Current enters through a terminal $+V_{CC}$ through diode 314 and a small amount of current is leaked through resistor 315 in order to keep diode 314 turned on, or in a conductive state at all times. The major part of the current however enters junction 313 and flows through the emitters of transistors 311 and 312 via resistors 309 and 310 respectively. Referring now to flip-flop 302 which is an ordinary set-reset flip-flop well known in the computer art, when terminal 1 is high then terminal 0 is low and vice versa; when terminal 1 is high, transistor 303 is turned on whereas transistor 305 is turned off and vice versa. Assuming that transistor 303 is turned on and transistor 305 is turned off, collector current from transistor 312 will flow to junction 308; but since transistor 305 is off it will be blocked at this point and must flow through write head 306 from junction 308 to junction 307, and then to the collector of transistor 303 and to ground via junction 309.1. Assuming once again that the opposite condition is true, that transistor 305 is turned on and transistor 303 if off; then current flows from the collector of transistor 311 to junction 307 and is blocked by transistor 303 which is in its OFF state and consequently current must flow through write head 306 from junction 307 to junction 308 and to the collector of transistor 305 and thence to the emitter and to ground through junction 309.1. It will also be observed that transistor 312 in this instance is also supplying current to transistor 305 and this current does not flow through the write head 306. It will further be observed that the write head current has switched direction at the same time that the flip-flop changes state. Thus, a switch has been provided by flip-flop 302 and transistors 303 and 305 whereby the write head current may be reversed by changing the state of the flip-flop. The amount of current flowing from the collectors of transistors 311 and 312 is dependent upon two things: (A) The value of resistor 309 which controls the current in transistor 311 and the value of resistor 310 which will control the current at transistor 312; (B) the DC potential of the bases of these transistors which in turn is controlled by select write current circuits 12-1.

Referring to block 12-1 of FIG. 4, the purpose of transistor 336 is to selectively turn on a heavy write current for a short interval of time in order to erase that section of tape positioned between the write head and the erase head. When transistor 336 is turned on by means not shown, its collector is switched to a potential substantially equal to the emitter potential and the line coupled diodes 320, 321, 322 and 329 which are also substantially at this potential. This potential is applied to the base of transistor 318 which potential is applied to the emitter of transistor 318 which in turn is applied to the bases of transistors 311 and 312, thus determining the value of the write current being used i.e. in this instance the write current for erase purposes.

When gates 331, 333 and 335 are not enabled and also transistor 336 is not turned on then the bases of transistors 311 and 312 respectively will have a potential equal to $+V_{CC}$. When gate 331 is enabled, however, by the proper signals applied to its input then transistor 330 will be turned on or will be in its conducting state and the collector of transistor 330 will be substantially at ground. In this state therefore it acts together with resistors 323 and 324 as a voltage divider between $+V_{CC}$ and ground. Consequently, current will flow through the base of transistor 318 resistor 316 and the external circuit coupled to the bases of transistors 311 and 312. The potential that is established at the bases of transistor 311 and 312 controls the write current and that potential in turn is determined by the potential of the emittere of transistor 318 which in turn is determined by the potential applied at its base which in turn is determined by the potential at the voltage divider. This value once again is determined by the value of the resistors 323 and 234. Consequently by selecting different voltage dividers the write current to be used can be controlled, and this selection procedure can be accomplished by providing enabling means for the various circuits such as AND gates 331, 333 and 335 and applying the proper functions indicative of the set of conditions desired.

It will be apparent from the foregoing disclosure of the invention that numerous modifications, changes and equivalents will now occur to those skilled in the art, all of which fall within the true scope contemplated by the invention.

What is claimed is:

1. A control system for a computer tape transport system capable of utilizing various types of magnetic tapes and encoding techniques, and capable of operating in any single one of a plurality of modes, said control system optimally controlling read/write operations under various sets of conditions and comprising:
    a. reflective patch means affixed to computer compatible magnetic tape mounted on said tape transport system, said patch means arranged in a preselected manner forming a code which identifies the type of tape that is mounted on the tape transport system;
    b. electro-optical sensing means responsive to the coded arrangement of said reflective patch means for producing coded electric signals indicative of the type of tape mounted on said computer tape transport system;
    c. a plurality of electrical control circuits coupled to said electro-optical sensing means responsive to selected ones of the coded electrical signals, said plurality of electrical circuits producing electrical control signals for optimally controlling said computer tape transport system in any one of the plurality of modes of operations, said plurality of control electrical circuits further comprising:
        1. a plurality of inverting amplifying networks each having inverter input and output means for selectively introducing electrical signals to said plurality of inverting amplifying networks and selectively abstracting inverted amplified electric signals from said plurality of inverting amplifying networks; and,
        2. a plurality of AND gate networks each having at least one AND gate input means and at least one AND gate output means, and wherein said inverter input means are coupled one each to an AND gate output means, and with said predetermined ones of said AND gate input means adapted for receiving a selected one of a plurality of electric signals, each selected signal representing a selected one of a predetermined number of functions indicative of the state of said tape drive, and wherein predetermined ones of said inverter output means are coupled to an AND gate input means of predetermined AND gates.

2. A control system as recited in claim 1 wherein said computer tape transport system is adapted to selectively read from or write on high resolution or low resolution magnetic tape wherein said reflective patch means comprise a beginning-of-tape (BOT) reflective patch and a high resolution tape reflective patch affixed in a forward location from said BOT and wherein said high resolution tape reflective patch affixed in a forward location of said BOT reflective patch on the magnetic tape signifies high resolution tape on the tape drive and no reflective patch forward of BOT reflective patch signifies low resolution tape on the tape drive.

3. A control system as recited in claim 1 wherein the modes of operation of said computer tape transport system include an NRZ and a PE mode, and further include NRZ (non-return-to-zero) and PE (phase encoding) select-circuit means coupled to said plurality of electrical control circuits for selecting the NRZ or PE mode of operation.

4. A control system as recited in claim 2 wherein the low resolution tape is encoded in either NRZ (non-return-to-zero) or PE (phase encoding) codes and wherein the high resolution tape is encoded in PE code.

5. A control system for a computer tape transport system capable of utilizing various types of magnetic tapes and encoding techniques and capable of operating in any single one of a plurality of modes, said control system optimally controlling read/write operations under various sets of conditions and comprising:
  a. reflective patch means affixed to computer compatible magnetic tape mounted on said tape transport system, said patch means arranged in a preselected manner forming a code which identifies the type of tape that is mounted on the tape transport system;
  b. electro-optical sensing means responsive to the coded arrangement of said reflective patch means for producing coded electric signals indicative of the type of tape mounted on said computer tape transport system;
  c. a plurality of electrical control circuits coupled to said electro-optical sensing means responsive to selected ones of the coded electrical signal, said plurality of electrical circuits for producing electric control signals for optimally controlling said computer tape transport system in any one of the plurality of modes of operations, said plurality of control electrical circuits further comprising:
    1. a plurality of inverting amplifying networks each having inverter input and output means for selectively introducing electric signals to said plurality of inverting amplifying networks and selectively abstracting inverted amplified electric signals from said plurality of inverting amplifying networks; and
    2. a plurality of AND gate networks each having at least one AND gate input means and at least one AND gate output means, and wherein said inverter input means are coupled one each to an AND gate output means, and with predetermined ones of said AND gate input means adapted for receiving a selected one of a plurality of electric signals, each selected signal representing a selected one of a predetermined number of functions indicative of the state of said tape drive, and wherein predetermined ones of said inverter output means are coupled to an AND gate input means of predetermined AND gates;
  d. a plurality of amplifying electric networks for selectively amplifying electric signals each amplifying network having input and output means for selectively introducing electric signals to selected ones of said plurality of amplifying networks and selectively abstracting amplified electric signals from said plurality of amplifying networks; and,
  e. a gain selecting electric network coupled to said plurality of amplifying networks and to said plurality of electrical control circuits, said gain selecting network responsive to electrical control signals from said plurality of electrical control circuits for selecting optimum gain for said plurality of amplifying electric networks.

6. A control system for computer tape transport system as recited in claim 5 including a non-return-to-zero — phase-encoding (NRZ-PE) mode select means responsive to electric mode signals indicative of the type of encoding technique then being utilized by said tape transport system, said NRZ-PE mode select means coupled to said plurality of amplifying electric networks for selecting one of said plurality of amplifying electric networks.

7. A control system for computer tape transport system as recited in claim 6 wherein said plurality of amplifying electric networks include a PE amplifier for optimally amplifying PE electric signals, and an NRZ amplifier for optimally amplifying NRZ signals, and a PE/NRZ switch means for selecting said PE or NRZ amplifier.

* * * * *